Patented May 27, 1947

2,420,998

UNITED STATES PATENT OFFICE 2,420,998

PROCESS FOR FERMENTING CARBOHYDRATES TO PRODUCE BUTANOL AND ISOPROPANOL

Samuel C. Beesch and David A. Legg, Philadelphia, Pa., assignor to Publicker Industries Inc., a corporation of Pennsylvania No Drawing. Application July 27, 1944,
Serial No. 546,904

9 Claims. (Cl. 195—44)

The present invention relates to bacterial fermentations and it relates more particularly to the production of butyl alcohol, isopropyl alcohol and other substances by the bacterial fermentation of carbohydrate mashes.

An object of the present invention is to provide a new and improved process for the production of butyl and isopropyl alcohols by bacterial fermentation. Another object of the present invention is to provide for fermentation of carbohydrate mashes by a certain newly discovered organism, to be hereinafter described, which gives substantial yields of butyl and isopropyl alcohols. Still another object of the present invention is to produce butyl and isopropyl alcohols by means of a certain newly discovered organism which is capable of producing substantial yields of said alcohols not only from sugars but also from starches without the need for preliminary hydrolysis thereof.

Other objects and advantages of the present invention will be apparent in the following detailed description and appended claims.

It is well known in the art that sugar solutions or mashes can be fermented by various bacteria to produce butyl and isopropyl alcohols. These organisms heretofore employed have, however, been incapable of fermenting starches; it having been necessary first to hydrolyze the starch to sugar before the fermentation could be carried out.

We have discovered and isolated a new organism which we have named Clostridium amylosaccharo butyl-propylicum which is capable of fermenting not only sugars but also starches without preliminary hydrolysis to give substantial yields of butyl and isopropyl alcohols plus relatively small percentages of acetone. This organism may be isolated from soil by making heat-shocked enrichment cultures in molasses medium, plating anaerobically, selecting bacterial colonies of the type to be hereinafter described, and testing their fermentative capacity on molasses and starch media of the kind set forth in the examples given hereinbelow.

The organism will be described using the descriptive chart of the Society of American Bacteriologists for facility of identification.

TABLE

Name: Clostridium amylo-saccharo butyl-propylicum.
Source: Soil.

I. *Morphology*

1. Vegetative cells.
    Medium used—Potato glucose medium (300 gms. potato (Idaho), moist weight, 10 gms. of glucose, 1 gm. ammonium sulfate, 3 gms. calcium carbonate per liter).
    Incubation 20 hrs. at 30° C.
    Stain used—Nigrosin without heat.
    Form—Short and long rods.
    Arrangement—Single and chains.
    Usual limits of length—2.5 to 12.0 $\mu$; of diameter—0.60 to 2.8 $\mu$.
    Size of majority—5.1 by 1.3 $\mu$.
    Ends—Rounded.
2. Sporangia—Present.
    Medium used—Potato glucose medium.
    Incubation—36 hrs. at 30° C.
    Stain used—Nigrosin without heat.
    Form—Spindled and clavate.
3. Endospores—Present.
    Medium used—Potato glucose medium.
    Incubation—72 hrs. at 30° C.
    Stain used—Nigrosin without heat.
    Location of endospores—Sub-terminal to terminal.
    Form—Cylindrical to oval.
    Usual limits of length—0.8 to 2.8 $\mu$; of diameter—0.5 to 2.0 $\mu$.
    Size of majority—1.8 by 1.0 $\mu$.
4. Motility.
    Medium used—Glucose broth (5 gms. peptone, 3 gms. beef extract, 10 gms. glucose per liter).
    Incubation—20 hrs. at 30° C.
    Motility—Motile.
    Medium used—Nutrient agar (agar 17 gms., glucose 20 gms., molasses 8 gms., peptone 6 gms., beef extract 3 gms., $(NH_4)_2SO_4$ 1 gm. per liter).
    Incubation—40 hrs. at 30° C.
    Motility—Motile.
5. Flagella—Present.
    Medium used—Molasses mash (40 gms. sugar calculated on Cuban invert molasses, ammonium sulfate 2.2 gms., calcium carbonate 2.4 g., calcium acid phosphate 1.3 gms. per liter).
    Incubation—24 hrs. at 30° C.
    Stain used—Lofflers flagella stain.
    Attachment—Peritrichous.
6. Irregular forms—Present.
    Medium used—Potato glucose medium.
    Incubation—72 hrs. at 30° C.

7. Staining reactions.
  (a) Gram stain.
    Medium used—Potato glucose medium.
    Incubation—20 hrs. at 30° C.
    Stain used—Kopeloff Beerman modification.
    Stain—Positive; variable after 24 hrs.
  (b) Iodine stain.
    Medium used—Nutrient agar.
    Incubation—48 hrs. at 30° C.
    Granulose—Positive.

II. Cultural characteristics

1. Agar colonies.
    Medium used—Nutrient agar.
    Incubation—48 hrs. at 30° C.
    Form—Round, or circular, tendency to spread out.
    Surface—Pearly lustre, smooth.
    Edge—Entire.
    Elevation—Convex.
    Optical character—Opalescent with dark centers finely granular structure, light tan.
2. Agar stroke.
    Medium used—Nutrient agar.
    Incubation—96 hrs. at 30° C.
    Growth—Anaerobic, abundant.
    Form—Spreading.
    Lustre—Glistening.
    Chromogenesis—Light cream to tan.
    Odor—Butylic.
    Consistency—Riscid.
    Change in color of medium—None.
3. Nutrient broth.
    Medium—Nutrient broth (5 gms. peptone, 3 gms. beef exract per liter).
    Incubation—30° C.
    Surface growth—None.
    Clouding—Slight.
    Odor—None.
4. Gelatin stab.
    Medium used—Nutrient gelatin (gelatin 150 gms., glucose 10 gms., peptone 5 gms., beef extract 3 gms. per liter).
    Incubation—4 days 30° C.
    Growth—Best below surface to bottom line of puncture.
    Liquefaction—30 days none.
    Change in color of medium—None.
5. Potato stroke.
    Medium—Sterilized potato.
    Incubation—96 hrs. at 30° C.
    Growth—Abundant.
    Form—Spreading.
    Luster—Glistening.
    Chromogenesis—Light cream to yellow.
    Odor—Butylic.
    Consistency—Viscid.
    Change in medium—None to slight liquefaction.

III. Physiological characteristics

1. Temperature relations: Optimum fermentation temperature—29°–32° C.
2. Relation to reaction of medium: Optimum final pH—5.40–5.80.
3. Chromogenesis.
    Nutrient agar—Pearly lustre with tan color.
    Nutrient gelatin—None.
    Potato—Light cream to yellow.
4. Production of indole.
    Medium used—Glucose tryptophane (glucose 2.5 gms., tryptophane 1.0 gm. per litre).
    Incubation—96 hrs. at 36° C.
    Test used—p-Dimethylaminobenzaldehyde.
    Indole—Absent.
5. Production of hydrogen sulphide.
    Medium used—Lead acetate agar (agar 15 gms. Bactotryptone 20 gms., glucose 10 gms., lead acetate 0.2 gms. per liter).
    Incubation—72 hrs. at 30° C.
    Hydrogen sulphide—Absent or present in traces.
6. Relation to oxygen.
    (a) Medium used—Nutrient agar.
        Incubation—48 hrs. at 30° C.
        Growth (aerobic incubation)—Absent.
        Growth (anaerobic incubation)—Abundant.
    (b) Medium used—Potato glucose medium in deep tubs.
        Incubation—24 hrs. at 30° C.
        Growth (aerobic incubation)—Abundant.
        Growth (anaerobic incubation)—Abundant.
7. Litmus milk.
    Incubation—30° C.
    Reaction (3 days)—Acid.
    Curd (10 days)—Acid curd.
    Peptonization (15 days)—Slight if any.
    Reduction of litmus (1 day)—Reduced.
8. Nitrate reduction.
    Medium—8% potato, 1% glucose, 0.1% KNO$_3$.
    Incubation—1 day to 4 days.
    Test used—a-Naphthylamine sulfanilic acid.
    Reduction—None.
9. Fermentation reactions.
    (a) Acid and gas production.
        Medium used—Nutrient broth+10 gm. per liter of carbohydrate or alcohol to be tested.

| Carbohydrate or alcohol | Acid production | Gas production (72 hrs.) |
|---|---|---|
| Eseulin | + | + |
| Trehalose | + | + |
| Arabinose | + | + |
| Rhamnose | − | − |
| Xylose | + | + |
| Glucose | + | + |
| Fructose | + | + |
| Galactose | + | + |
| Mannose | + | + |
| Lactose | + | + |
| Sucrose | + | + |
| Maltose | + | + |
| Raffinose | − | − |
| Melezitose | | |
| Corn starch | + | + |
| Soluble starch | + | + |
| Inulin | + | + |
| Dextrin | + | + |
| Glycogen | + | + |
| Glycerol | − | − |
| Erythritol | − | − |
| Mannitol | − | − |
| Sorbitol | − | − |
| Dulcitol | − | − |
| Salicin | + | + |
| Alpha-methyl glucoside | + | + |
| Inositol | − | − |
| Melibiose | − | − |

− Negative; + positive.

An important characteristic of these bacteria from a commercial standpoint is their ability to produce consistent yields of solvents ranging between about 30% to about 33% or more from invert sugar, glucose, or mixtures of these sugars with sucrose in mashes wherein the percentage of sucrose does not exceed about 30% of the total sugar. When the organism is used to ferment blackstrap molasses, which contians sucrose and invert sugar in the ratio of about 60 to 40, the yields of solvents are somewhat lower unless part of the sucrose is inverted.

Another important characteristic of these bacteria is their ability to produce substantial yields of solvents from unsaccharified cereal mash to which suitable nutrients have been added.

Still another important characteristic of these bacteria is their ability to ferment mashes wherein the sugar concentration is as high as 7% or more without any appreciable falling off in the yields of solvent.

The following are illustrative examples of fermentations carried out with Clostridium amylo-saccharo butyl-propylicum:

EXAMPLE 1

A high-test molasses containing about 20% sucrose and about 56% invert sugar was used to form an aqueous mash having a total sugar concentration of about 6%. To about 3,000 parts of this mash were added about 10 parts of ammonium sulphate, 12 parts of calcium carbonate and ½ part of $P_2O_5$ as calcium superphosphate. The mash was then sterilized by heating for about 30 minutes at about 15 pounds pressure. The sterilized mash was cooled to about 30° C. and inoculated with about 3% of a 24 hour active culture of Clostridium amylo-saccharo butyl-propylicum and incubated at 30° C.

The fermentation was complete in about 50 hours and analysis showed 19.15 grams of solvent per liter of mash, which corresponds to a yield of 31.9% based on the total sugar content of the mash. The composition of the solvent was approximately 70% butyl alcohol, 27.3% isopropyl alcohol and 2.7% acetone.

EXAMPLE 2

The procedure of Example 1 was repeated using a mash having about 7% total sugar.

The fermentation was complete in about 60 hours and analysis showed 20.3 grams of solvent per liter of mash, which corresponds to a yield of 30.5% based on the total sugar content of the mash.

EXAMPLE 3

A blackstrap molasses containing about 35.7% sucrose and 17% reducing sugars was used to form an aqueous mash having a total sugar concentration of about 6%. To about 3,000 parts of this mash were added about 10 parts of ammonium sulphate and 12 parts of calcium carbonate. The mash was then sterilized, cooled, and inoculated with about 3% of a 24 hour active culture of Clostridium amylo-saccharo butyl-propylicum. The fermentation was complete in about 60 hours and, on distillation, yielded 15.35 grams per liter of solvents corresponding to a yield of 25.6% based on total sugar content.

EXAMPLE 4

About 3,000 parts of mash were made up to contain about 183 parts of dry corn, 9 parts of ammonium sulphate, and 12 parts of calcium carbonate. The mash was cooked for about 2½ hours at about 15 pounds pressure, after which it was cooled to about 30° C. and inoculated with about 3% of a 24 hour active molasses culture of Clostridium amylo-saccharo butyl-propylicum.

Upon completion of the fermentation, distillation yielded 14.6 grams per liter of total solvents corresponding to a yield of 24% of the dry corn or approximately 33% of the starch.

The carbohydrate concentration of the final mash may be as high as 7% or even more. However, if the sugar or grain source is deficient in suitable degraded protein, it is desirable to add soluble nitrogen in the form of ammonia or its salts, or organic derivatives including urea, corn steep water or other sources of degraded protein, etc. Furthermore, if the raw material is deficient in buffering materials, steps must be taken to keep the pH of the mash from falling below 4.8 during the fermentation. This can be done by gradually adding alkaline neutralizing agents, such as alkali or alkaline earth oxides, hydroxides or carbonates, or alkaline ammonium compounds, in suitable amounts and at suitable rates. The amounts so added should not raise the pH appreciably above 6.8 nor should it be more than is necessary to prevent the pH from falling below 4.8. The amounts required can readily be determined by experiment for each type of raw material and neutralizing agent.

The average composition of the solvents produced when a sugar mash, such as those of Examples 1, 2 and 3, is fermented is about 65–72% butyl alcohol, 26–32% isopropyl alcohol and 2–4% acetone, although a trace of ethyl alcohol may also be found. Some variation in the composition of the solvents may result, however, due to change in the composition of the medium or to the method of maintaining the pH above 4.8.

The organism may be preserved indefinitely in the spore form by pouring molasses or potato medium culture containing clostridia or spores on sterile soil and drying under aseptic conditions.

In order to start an active culture, we may inoculate, for example, 10 to 20 cc. of sterile 10% potato medium with about 0.05 gram of the soil culture, heat shock if desired, and incubate at about 30° C. for about 24–36 hours. About 3% of this culture may then be used to inoculate a sterile molasses medium containing 4–6% of sugar, about 0.2% of ammonium sulphate, and 0.3% of calcium carbonate. After 16–24 hours incubation at 30° C. this culture may be used to seed other mashes of similar composition, in each case using about 2–4% of inoculum. At least 8 transfers can be made in this way so that any desired quantity of inoculum can be developed by daily transfers to culture vessels of increasing size.

About 2–4% of the inoculum is used in the fermentation. The inoculum may contain, in addition to the sugary medium, assimilable nitrogen and other nutrients as required and may be adjusted to a pH of about 4.8 to 6.8.

The fermentation may be carried out at between about 28 and 35° C. for about 45 to 72 hours.

The organism described hereinabove is capable of fermenting other sugary mashes, as for example, mashes made from beet sugar or beet molasses; cane sugar; hydrolyzed carbohydrates, such as dextrine, inulin and syrups; and other industrial sources of sugar, with the limitation noted above, namely, that the sugar should not contain more than about 30% sucrose for optimum results.

The organism is capable of fermenting other cereal grains, in addition to corn; as for example, wheat, oats, rye, barley, etc.

The present invention may be embodied in

Having thus described our invention, what we claim as new and desire to protect by Letters Patent is:

1. A process for producing butyl and isopropyl alcohols which comprises forming an aqueous mash containing a carbohydrate, of the group consisting of cereals and sugars and containing assimilable nitrogen, inoculating the mash with a bacterial culture containing Clostridium amylo-saccharo butyl-propylicum, and incubating said inoculated mash at a temperature and for a time adequate to permit fermentation thereof.

2. A process for producing butyl and isopropyl alcohols which comprises forming an aqueous mash containing not more than about 7% of a carbohydrate of the group consisting of cereals and sugars and containing assimilable nitrogen, inoculating the mash with a bacterial culture containing Clostridium amylo-saccharo butyl-propylicum and incubating said inoculated mash at between 28 and 35° C. for about 45 to 72 hours while maintaining its pH between about 4.8 and 6.8, thereby to permit fermentation of said mash by said bacterial culture.

3. A process for producing butyl and isopropyl alcohols which comprises inoculating an aqueous mash of a sugary material with a bacterial culture containing Clostridium amylo-saccharo butyl-propylicum and maintaining the mash at a temperature sufficient to bring about active fermentation by the action of said bacterial culture.

4. A process for producing butyl and isopropyl alcohols which comprises forming an aqueous mash containing not more than about 7% of a sugary material and containing assimilable nitrogen, inoculating the mash with a bacterial culture containing Clostridium amylo-saccharo butyl-propylicum and incubating said inoculated mash at a temperature and for a time adequate to permit fermentation thereof.

5. A process for producing butyl and isopropyl alcohols which comprises forming an aqueous mash containing a sugary material and suitable bacterial nutrients, inoculating said mash with a small amount of an active bacterial culture containing Clostridium amylo-saccharo butyl-propylicum, and incubating the inoculated mash at a temperature adequate to bring about active fermentation of said mash, for a time sufficient to convert substantially all the sugary material to products of fermentation.

6. A process for producing butyl and isopropyl alcohols which comprises forming an aqueous mash containing a cereal starch carbohydrate and containing assimilable nitrogen, inoculating the mash with a bacterial culture containing Clostridium amylo-saccharo butyl-propylicum and incubating said inoculated mash at a temperature and for a time adequate to permit fermentation thereof.

7. A process for producing butyl and isopropyl alcohols which comprises forming an aqueous mash containing a cereal starch carbohydrate and containing assimilable nitrogen, inoculating the mash with a bacterial culture containing Clostridium amylo-saccharo butyl-propylicum and incubating said inoculated mash at a temperature and for a time adequate to permit fermentation thereof while maintaining the pH of the mash between about 4.8 and 6.8.

8. A process for producing butyl and isopropyl alcohols which comprises forming an aqueous mash containing not more than about 7% of a cereal starch carbohydrate and containing assimilable nitrogen, inoculating the mash with a bacterial culture containing Clostridium amylo-saccharo butyl-propylicum and incubating said inoculated mash at between 28 and 35° C. for about 45 to 72 hours while maintaining its pH between about 4.8 and 6.8, thereby to permit fermentation of said mash by said bacterial culture.

9. A process for producing butyl and isopropyl alcohols which comprises forming an aqueous mash containing a cereal starch carbohydrate and suitable bacterial nutrients, inoculating said mash with a small amount of an active bacterial culture containing Clostridium amylo-saccharo butyl-propylicum and incubating the inoculated mash at a temperature adequate to bring about active fermentation of said mash, for a time sufficient to convert substantially all the cereal starch carbohydrate to products of fermentation.

SAMUEL C. BEESCH.
DAVID A. LEGG.

REFERENCES CITED

The following references are of record in the file of this patent:

UNITED STATES PATENTS

| Number | Name | Date |
|---|---|---|
| 2,001,930 | Daranyi | May 21, 1935 |
| 2,063,448 | Legg | Dec. 8, 1936 |
| 2,219,426 | Loughlin | Oct. 29, 1940 |
| 1,725,083 | Izsak | Aug. 20, 1929 |

FOREIGN PATENTS

| Number | Country | Date |
|---|---|---|
| 415,312 | Great Britain | 1934 |